United States Patent Office 3,268,529
Patented August 23, 1966

3,268,529
3-CYANOALKYL SUBSTITUTED 4-(3H)-QUINAZOLINONES
James W. Bolger, Canoga Park, Calif., assignor to Rexall Drug and Chemical Company, Los Angeles, Calif., a corporation of Delaware
No Drawing. Filed Jan. 17, 1964, Ser. No. 338,303
2 Claims. (Cl. 260—251)

This invention relates to compositions of matter classified in the art of chemistry as substituted 4-(3H)-quinazolinones.

The invention sought to be patented is described as residing in the concept of a chemical compound in which there is attached to the nitrogen atom at the 3-position of a 4-(3H)-quinazolinone nucleus or its hereinafter disclosed equivalents a cyano-lower alkyl group.

As used throughout the specification and the claims the terms "lower alkyl" and "lower alkylene" embrace both straight and branched-chain alkyl and alkylene radicals, respectively, containing 1 to 6 carbon atoms.

The tangible embodiments of this invention possess the inherent general physical characteristics of being crystalline solids. The aforementioned physical characteristics, taken with elemental and spectral analyses, the nature of the starting materials and mode of synthesis, positively confirms the structure of the compounds sought to be patented.

The tangible embodiments of this invention possess the inherent applied use characteristics of having pharmacological activity as diuretic agents as determined by recognized and accepted pharmacological test procedures. In addition, the terminal cyano group on the substituent at the 3-position renders these compounds amenable to the reactions of this group as are well known in the art of chemistry and accordingly, the tangible embodiments of this invention are valuable chemical intermediates.

The manner and process of making and using the invention will now be generally described so as to enable one skilled in the art of chemistry to make and use the same as follows:

The starting materials for the compounds of this invention, 3-haloalkyl-4-(3H)-quinazolinones or their hereinafter disclosed equivalents may be prepared according to the method described by Baker et al., J. Org. Chem. 17: 35–51 (1952).

The preparation of the tangible embodiments of this invention is illustrated as follows:

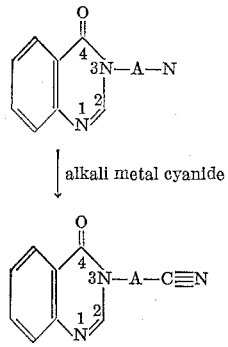

wherein A is lower alkylene and X is halogen.

Starting materials bearing on the benzene ring of the 4-(3H)-quinazolinone nucleus one or more substituents, such as lower alkoxy, hydroxy, halogen, or lower alkyl, and/or bearing a lower alkyl or phenyl group at the 2-position are the full equivalents of the 3-haloalkyl-4-(3H)-quinazolinone starting materials in the reaction with an alkali metal cyanide in the foregoing reaction sequence, thereby to prepare correspondingly substituted 4-(3H)-quinazolinones having the same utility as the specific finished products depicted above.

The reaction depicted hereinabove is carried out by treating the starting material with an alkali metal cyanide such as, for example, sodium cyanide in the presence of dimethylsulfoxide, according to the method described by Friedman and Schlechter (J. Org. Chem. 25: 877 (1960)). The product is then isolated from the reaction mixture by dilution with water, followed by a suitable extraction.

Because the tangible embodiments of this invention contain nitrogen atoms which are capable of combining with acids to form acid addition salts or quaternary ammonium salts, it is contemplated that such salts are the full equivalents of the free bases and are included within the scope of this invention. Methods for the preparation of such salts include methods known to the art of chemistry, such as the interreaction of equivalent amounts of the selected base and an acid such as, for example, hydrochloric, hydrobromic, citric, maleic, sulfuric, nitric and the like, in a mutual inert solvent solution, followed by removal of the solvent. The acids which are preferred for preparing acid addition salts of the novel quinazolones of this invention are the pharmaceutically acceptable acids. The term "pharmaceutically acceptable acids" designates those acids which do not materially increase the toxicity of the bases with which they are combined. Typical of the quaternary ammonium salts are those formed with such alkyl halides as methyl iodide, ethyl bromide, n-hexyl bromide and the like.

The tangible embodiments of this invention as free bases, as quaternary ammonium salts or as the salts of pharmaceutically acceptable acids, may be combined with conventional diluents and carriers, to form such dosage forms as tablets, capsules, solutions, suspensions, suppositories and the like.

The best mode contemplated by the inventor of carrying out his invention will now be set forth as follows:

EXAMPLE

*3-(2-cyanoethyl)-4-(3H)-quinazolinone*

Dried 3-iodoethyl-4-(3H)-quinazolinone (9 g., 0.03 mole) and sodium cyanide (1.62 g.) in dimethylsulfoxide (40 ml.) are heated to 100° C. and stirred for two hours. The temperature is maintained at 100° C. during stirring. Water (150 ml.) is added and the mixture is extracted with dichloromethane. The extract is dried over anhydrous magnesium sulfate and then evaporated to yield an oil. The oil is distilled at 200°–220° C. and 0.5–0.7 mm. Hg. The product is crystallized from dichloromethane/petroleum ether (30°–60° C. B.P.) to yield 3 g. (50%) of crystalline material, M.P. 142°–143° C.

*Analysis.*—Calc. for $C_{11}H_9N_3O$ (M.W. 199.20): C, 66.32%; H, 4.56%; N, 21.10%. Found: C, 66.42%; H, 4.53%; N, 21.08%.

The subject matter which the applicant regards as his invention is particularly pointed out and distinctly claimed as follows.

What is claimed is:
1. 3-(cyano-lower alkyl)-4-(3H)-quinazolinone.
2. 3-(2-cyanoethyl)-4-(3H)-quinazolinone.

References Cited by the Examiner

Elderfield: Heterocyclic Compounds, vol. 6, John Wiley & Sons, New York, 1957, pages 326–327.
Ried et al.: Chemische Berichte, vol. 95, No. 12, 1962, pages 3042–3047.
Somasekhara et al.: Current Science, vol. 33, No. 7, April 1964, pages 209–210.

HENRY R. JILES, *Acting Primary Examiner.*
MARY O'BRIEN, *Assistant Examiner.*